US006157549A

United States Patent [19]

Nath

[11] Patent Number: 6,157,549

[45] Date of Patent: Dec. 5, 2000

[54] POWER SUPPLY WITH MULTIPLE MODE OPERATION

[75] Inventor: Gautam Nath, Olympia, Wash.

[73] Assignee: Thomson Licensing S.A., Boulogne Cedex, France

[21] Appl. No.: 09/425,404

[22] Filed: Oct. 22, 1999

[51] Int. Cl.[7] .................... H02M 3/335

[52] U.S. Cl. .................... 363/21; 348/730

[58] Field of Search .................... 363/21, 200, 95, 363/97, 131; 348/730

[56] References Cited

U.S. PATENT DOCUMENTS

| | | | |
|---|---|---|---|
| 3,956,669 | 5/1976 | Del Ciello | 315/411 |
| 4,516,168 | 5/1985 | Hicks | 363/56 |
| 4,516,169 | 5/1985 | Truskalo | 358/190 |
| 4,588,929 | 5/1986 | Wedam et al. | 315/395 |
| 4,633,146 | 12/1986 | Babcock | 315/395 |
| 4,734,771 | 3/1988 | Lendaro et al. | 363/56 |
| 4,740,879 | 4/1988 | Peruth | 363/131 |
| 4,761,723 | 8/1988 | Lendaro | 363/21 |
| 4,766,528 | 8/1988 | Marinus | 63/18 |
| 4,788,591 | 11/1988 | Decraemer | 358/190 |
| 4,930,060 | 5/1990 | Muterspaugh | 323/267 |
| 4,937,728 | 6/1990 | Leonardi | 363/97 |
| 4,975,592 | 12/1990 | Hahn et al. | 363/21 |
| 4,994,719 | 2/1991 | Lendaro | 315/411 |
| 5,126,930 | 6/1992 | Ann | 363/21 |
| 5,291,386 | 3/1994 | Wu | 363/21 |
| 5,353,215 | 10/1994 | Dinwiddie et al. | 363/65 |
| 5,453,921 | 9/1995 | Shutts | 363/21 |
| 5,578,916 | 11/1996 | Muterspaugh | 323/267 |
| 5,689,407 | 11/1997 | Marinus et al. | 363/21 |
| 5,812,383 | 9/1998 | Majid et al. | 363/21 |
| 5,831,837 | 11/1998 | Coyne et al. | 363/21 |
| 5,852,550 | 12/1998 | Majid et al. | 363/21 |
| 5,920,466 | 7/1999 | Hirahara | 363/21 |
| 5,949,154 | 9/1999 | Williams | 307/64 |
| 5,956,240 | 9/1999 | Williams | 363/21 |
| 5,959,851 | 9/1999 | Shutts | 363/21 |
| 5,999,421 | 12/1999 | Liu | 363/21 |

*Primary Examiner*—Peter S. Wong
*Assistant Examiner*—Gary L. Laxton
*Attorney, Agent, or Firm*—Joseph S. Tripoli; Joseph J. Laks; Sammy S. Henig

[57] ABSTRACT

A video apparatus includes a data acquisition mode (DAM) module. The DAM module contains memory to store a television program guide information. A standby supply voltage, derived from a first winding of a transformer, is coupled for energizing the DAM module, only during scheduled times, set up by the user. A supply voltage B+ generated from a second winding of the transformer energizes the deflection circuits, during the run mode. Voltage B+ is coupled in a negative feedback path to a voltage regulator. When the DAM module is energized, the deflection circuits are turned off. The energized DAM module causes a significant increase in the current consumption from the first winding of the transformer. A switch is coupled in the feedback path of voltage B+. The switch causes an attenuation of a portion of voltage B+ that is fed back to the regulator, in the DAM operation. Thereby, a tendency of the standby supply voltage to decrease, during the DAM operation, is compensated.

18 Claims, 1 Drawing Sheet

DATA ACQUISITION MODE MODULE
42
VOLT. REG.
41
V2
REMOTE CONTROL & MICRO.
24
HOR. OSC. & DRIVER
25
DEF.-ON/OFF
DAM-ON/OFF
26
LY
26a
24a
PWM
31

POWER SUPPLY WITH MULTIPLE MODE OPERATION

The invention is related to a power supply of a video display apparatus.

It is known to provide a television receiver, which is capable of operating in a standby mode and in a power-on, run or normal mode. In the normal mode, the television receiver operates to process video and audio signals and to display those signals.

Typically, the deflection circuits are energized from a source of a supply voltage B+. Supply voltage B + is regulated in a regulator of a switch mode power supply and produced from a voltage developed in a first winding of a transformer. A portion of voltage B + is fed back to a control input of the switch mode power supply regulator via a negative feedback path for regulation purposes.

In a standby mode, the deflection stages are disabled and no current is drawn from the first winding. A standby supply voltage produced from a voltage developed in a second winding of the transformer may be used for energizing a microprocessor/remote control circuit, during the standby mode. Regulation of the standby supply voltage is obtained in a feedback path, indirectly, by sensing supply voltage B+. Because the first and second windings of the transformer are magnetically coupled, regulation of voltage B+ also results in the regulation of the standby supply voltage, referred to herein as cross-regulation.

A television receiver, embodying an aspect of the invention, includes, for example, a data acquisition mode (DAM) module. The DAM module contains memory to store a television program guide information. The information is carried during the vertical-blanking interval on selected broadcast stations. The DAM module is energized from a supply voltage derived from the standby supply voltage. The derived supply voltage is switched on only during scheduled times, that are set up by the user, and is turned off during the rest of the standby operation for reducing power consumption. When the DAM module is energized, the deflection circuits are disabled. However, stages of the receiver used for processing the incoming video signal are energized.

The energized DAM module causes a significant increase in the current consumption from the second winding of the transformer. The magnetic coupling between the first and second winding may not be tight, as in an ideal transformer. Therefore, the decreased loading in the first winding, resulting from the deflection circuits being disabled, and the increased loading in the second winding, resulting from the DAM module being energized, disadvantageously, tend to impair the aforementioned cross regulation. The result is a decrease in the standby supply voltage, during the DAM operation, relative to its level, during the run mode. It may be desirable to compensate for the loading changes, when the DAM module is energized.

In carrying out an aspect of the invention, a switch is coupled in the regulation feedback path of voltage B+. The switch is turned on during the standby operation. The switch causes an attenuation of the portion of voltage B+ that is fed back to the control input of the switch mode power supply, in the standby operation. Consequently, the PWM causes advantageously, the standby supply voltage to increase thus compensating for the tendency of the standby supply voltage to decrease.

SUMMARY

A video display power supply, embodying an inventive feature, includes an output stage for generating a first supply voltage coupled to a first load circuit when the first load circuit is energized. A source of a first on/off control signal coupled to the first load circuit is used for selectively energizing and deenergizing the first load circuit in accordance with the on/off control signal. A loading difference exhibited when the first load circuit is energized and when it is deenergized tends to vary a magnitude of the first supply voltage. A switched feedback network responsive to the first on/off control signal generates a feedback signal from the first supply voltage both when the first load circuit is energized and when it is deenergized. The feedback signal is coupled to a voltage regulator to regulate the first supply voltage in a negative feedback manner. The feedback signal and the first supply voltage have a first ratio therebetween when the first load stage is energized and a different, second ratio when the first load stage is deenergized.

BRIEF DESCRIPTION OF THE DRAWING

The sole FIGURE illustrates a power supply, embodying an inventive feature, of a television receiver.

DETAILED DESCRIPTION OF THE PRESENT INVENTION

Figure 1:
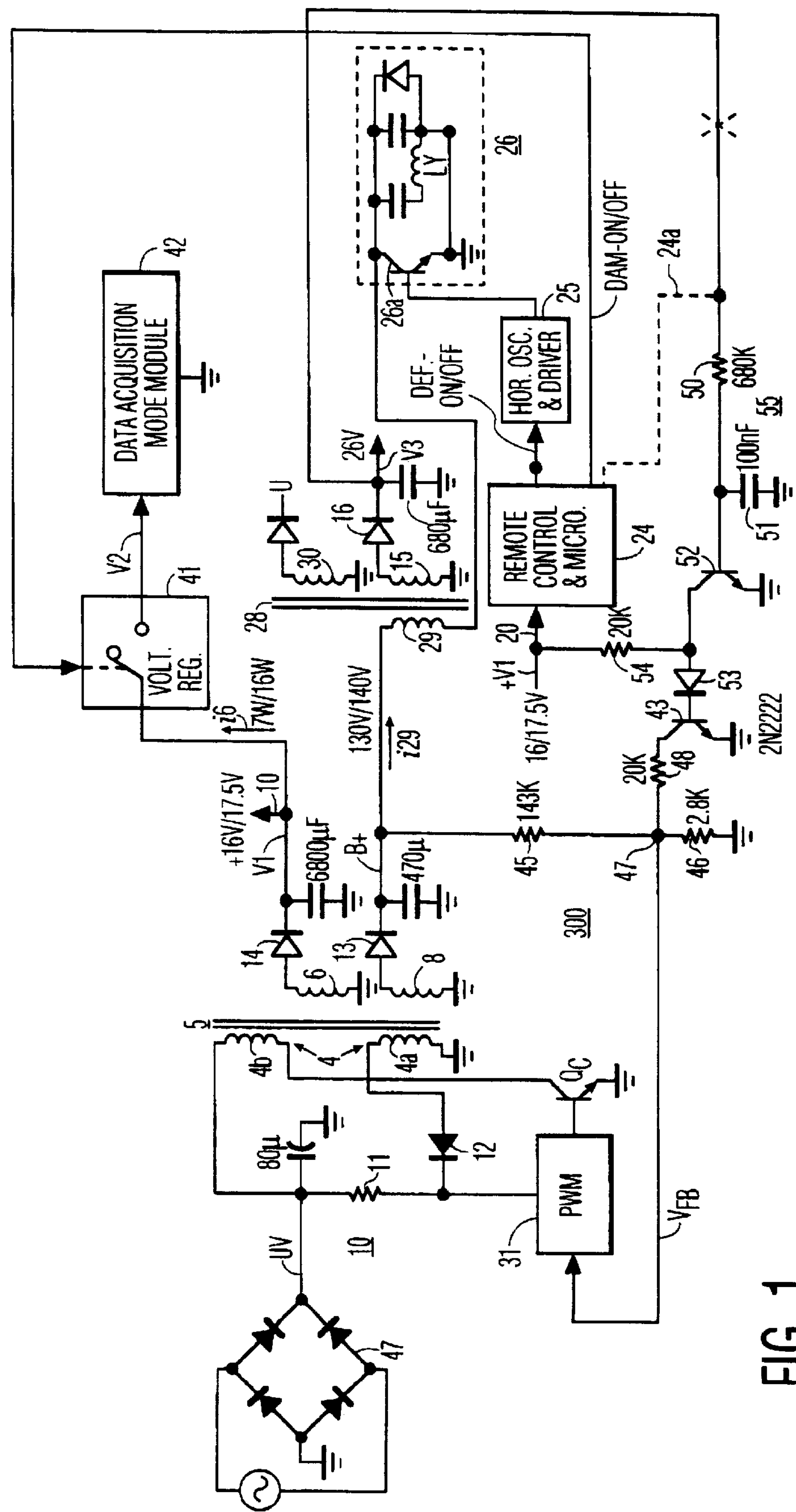

The sole FIGURE illustrates a portion of a television receiver circuit that includes a power supply 10. Power supply 10 is coupled to a bridge rectifier 47 producing an unregulated voltage UV. Voltage UV is coupled to a primary winding **4*b* of a transformer 5 . Winding 4*b* is coupled to a collector of a switching transistor QC. A conventional pulse-width modulator 31 is coupled to a base of transistor QC for generating current pulses in winding 4*b* in a conventional manner. Pulse-width modulator 31 is energized initially via a start-up resistor 11 that is coupled to voltage UV. After a start-up interval, pulse-width modulator 31 is energized via a diode 12 from a voltage developed in a second winding 4*a* of transformer 5, in a conventional manner. A regulated, output supply voltage B+ is produced from a voltage developed in a winding 8 of transformer 5 by a rectifier 13. Similarly, a regulated, output supply voltage V1 is produced from a voltage developed in a winding 6 of transformer 5 by a rectifier 14**.

Horizontal deflection circuit 26 includes a horizontal deflection winding LY coupled to a switching transistor **26*a*. Transistor 26*a* is coupled to a primary winding 29 of a flyback transformer 28. Voltage B+ is developed at a terminal of winding 29 that is remote from transistor 26*a*. Circuit 26 produces horizontal flyback pulses in a high voltage winding 30. Consequently, an ultor voltage U is developed. A low voltage winding 15 is coupled to a rectifier 16 that generates a supply voltage V3. Voltage V3** may be coupled to energize, for example, a vertical deflection circuit, not shown.

Voltage V1 is coupled to energize a remote control receiver/microprocessor 24. Remote control/microprocessor 24 produces a signal DEF-ON/OFF having an ON state, during the run mode, and an OFF state, during the standby mode, as selected by the user. When the ON state is produced, a horizontal oscillator and driver 25 produces horizontal line pulses that are coupled to horizontal deflection circuit 26 for operation in the run mode. The result is that a supply current i29 flowing in a current path that includes winding 8 is produced. When the OFF state is produced, horizontal oscillator and driver 25 ceases producing horizontal line pulses and horizontal deflection circuit 26 is disabled, in the standby mode. The result is that supply current i29 is significantly reduced. Thus, voltage V3 is generated, during the run mode operation, and is turned off, during standby mode.

Regulation of voltage B+ is obtained by coupling a voltage VFB, forming a portion of voltage B+, via a switched feedback network 300, embodying an inventive feature, to a control input of pulse-width modulator 31. Regulation of voltage V1 is obtained indirectly from the regulation of voltage B+, referred to as cross-regulation, because of the magnetic coupling of windings 6 and 8 of transformer 5.

A data acquisition mode (DAM) module 42 contains memory to store a television program guide information. The information is carried during the vertical-blanking interval on a selected broadcast station. Module 42 is energized from a supply voltage V2 produced in a voltage regulator 41 and derived from standby supply voltage V1. Regulator 41 includes, for example, a switched, series pass regulator, not shown.

Remote control receiver/microprocessor 24 produces an on/off control signal DAM-ON/OFF having an ON state, when the operation of DAM module 42 is required, and an OFF state, when the operation of DAM module 42 is not required. On/off control signal DAM-ON/OFF is coupled to regulator 41. Voltage V2 is turned on, in accordance with the ON State of on/off control signal DAM-ON/OFF, only during scheduled times, as programmed by the user. At other times, voltage V2 is turned off. Thereby, advantageously, excessive power consumption is avoided, when DAM module 42 is not required to process incoming information.

When DAM module 42 is energized, deflection circuit 26 is disabled. Whereas, stages, not shown, of the receiver, used for processing the incoming video signal are energized. During the run mode, supply current i29 results in a significant load with respect to winding 8 of transformer 5. In contrast, outside the run mode operation, when DAM module 42 is energized, winding 8 is not loaded.

Energized DAM module 42 causes a level of a supply current i6 from winding 6 of transformer 5 to be significant. The magnetic coupling between windings 6 and 8 may not be tight, as in an ideal transformer. Therefore, the decreased loading in winding 8, resulting from deflection circuit 26 being disabled, together with the increased loading in winding 6, resulting from DAM module 42 being energized, disadvantageously, tends to cause decrease in supply voltage V1, during the DAM operation. The decrease occurs in supply voltage V1 because of the imperfect magnetic coupling in transformer 5. The decrease in voltage V1, during the DAM operation, relative to its level, during the standby and run modes, occurs in a manner to decrease a ratio between voltages V1 and B+. The tendency of voltage V1 to decrease, if not compensated, could, disadvantageously, cause voltage V2 of regulator 41 to reach too low level, insufficient for maintaining proper regulation in regulator 41.

In carrying out an aspect of the invention, a transistor switch 43 is included in switched feedback network 300. Switched feedback network 300 includes a resistive voltage divider formed by a resistor 45 coupled to voltage B+ and a resistor 46, coupled to a junction terminal 47. Feedback voltage VFB that is coupled to modulator 31 is developed at terminal 47. Terminal 47 may be coupled to modulator 31 via an opto-coupler, not shown, for providing hot-ground/cold-ground isolation, in a well-known manner.

Switch transistor 43 is coupled to junction terminal 47 via a resistor 48. A series arrangement formed by resistor 48 and transistor 43 causes an attenuation of voltage VFB, in the DAM operation, when switch transistor 43 is turned on. Consequently, advantageously, the negative feedback loop causes supply voltage V1 to increase to a level that is closer to that developed, during the run mode, for providing compensation. Outside the standby mode of operation, switch transistor 43 is turned off for generating voltage B+ and voltage V1 at nominal voltage levels of 130V and 16V, respectively. Thus, advantageously, a ratio between voltages VFB and B+ changes in accordance with the state of switch transistor 43. Advantageously, switched feedback network 300 applies voltage B+ to modulator 31 both in the run mode and in the standby mode. Thereby, a common feedback path that includes resistor 45 is formed in each mode of operation. Thus, the feedback path is simplified.

Transistor 43 is controlled by supply voltage V3 that is developed only in the run mode, when deflection circuit 26 is energized. Supply voltage V3 is coupled via a resistor 50, forming a filter 55 with a capacitor 51, to a base electrode of a transistor switch 52 for turning on transistor switch 52. When transistor 52 is turned on, a collector voltage of transistor 52 is zero. Consequently, the zero volt collector voltage of transistor 52 is applied to a base electrode of transistor 43 via a diode 53, causing transistor 43 to be nonconductive.

On the other hand, when deflection circuit 26 is disabled, during the standby mode and the DAM operation, transistor 52 is non-conductive. The collector voltage of transistor 52 is pulled up via a pull-up resistor 54 that is coupled to voltage V1. Consequently, the collector voltage of transistor 52 is sufficiently large to turn on transistor 43. During the DAM operation, voltage B+ and voltage V1 are at voltage levels of 140V and 17.5V, respectively. Had transistor 43 and its associated circuits not been used, voltage V1 could have dropped to significantly. Transistor 43 increases voltage V1 to a level that is, advantageously, sufficient to operate voltage regulator 41 within a normal operation range.

As an alternative for controlling transistor 52 by voltage V3, remote control/microprocessor 24 produces a control signal 24*a* that is coupled to resistor 50 instead of voltage V3, as shown in a broken line. Signal 24*a* has an ON state, during the DAM operation, and an OFF state, outside the DAM operation, including during the run mode operation. The operation of transistor 52 in this alternative is similar to that when voltage V3 is used for controlling transistor 52, as explained before.

DAM module 42 may be included in other video apparatus such as, for example, a video tape recorder, not shown. In such situation, a transistor switch similar to transistor switch 43 may be included in a switched feedback network that is similar to switched feedback 300 of a corresponding power supply.

What is claimed is:

1. A video apparatus power supply, comprising:

a source of a first on/off control signal coupled to a first load circuit for selectively energizing said first load circuit, in a run mode of operation, and for disabling said first load circuit from being energized, in a standby mode of operation;

a source of a second on/off control signal coupled to a second load circuit for selectively energizing said second load circuit, at least during a first portion of said standby mode of operation, and for disabling said second load circuit from being energized, at least during a second portion of said standby mode of operation;

a power supply stage for generating supply voltages to energize said first load circuit and said second load circuit; and a switched feedback network responsive to one of said supply voltages for generating a feedback signal that is coupled to an input of said power supply stage to regulate said one of said supply voltages in a negative feedback manner, said feedback signal being generated during said standby and run modes of operation, from said one of said supply voltages and having, selectively, a first ratio associated with said feedback signal and said one of said supply voltages, during said run mode, when said first load circuit is energized, and a different, second ratio, during said first portion of said standby mode of operation, when said second load circuit is energized.

2. A video apparatus power supply according to claim 1 wherein said feedback network includes a switch operative in at least a first and second state and responsive to said first on/off control signal for producing a ratio difference associated with said first and second ratios in accordance with said states of said switch.

3. A video apparatus power supply according to claim 1 wherein said power supply stage includes a transformer having a first winding for generating from a voltage developed in said first winding a first supply voltage to energize a deflection circuit and a second winding for generating a second supply voltage from a voltage developed in said second winding to energize said second load circuit, wherein said source of said first on/off control signal is coupled to said deflection circuit for disabling said deflection circuit from being energized in said standby mode of operation such that a difference in currents produced in said transformer in said standby and run modes of operation tends to vary said first and second supply voltages in said standby mode of operation relative to that in said run mode of operation.

4. A video apparatus power supply according to claim 3, wherein said second supply voltage is cross-regulated via said transformer.

5. A video apparatus power supply according to claim 3 wherein said second supply voltage is cross-regulated via said transformer.

6. A video apparatus power supply according to claim 3 wherein said deflection circuit generates a control signal that is determined in accordance with said first on/off control signal and wherein said switched feedback network is responsive to said control signal for varying said first and second ratios.

7. A video apparatus power supply according to claim 1 wherein said first load circuit comprises a deflection circuit and said second load circuit comprises a data acquisition mode module.

8. A video apparatus power supply according to claim 1, wherein a switch is coupled in a feedback signal path between said one of said supply voltages and a voltage generator.

9. A video apparatus power supply according to claim 8, wherein said feedback signal path comprises a voltage divider and wherein said switch is coupled to said voltage divider for varying a ratio between impedances of said voltage divider, in accordance with said states of said switch.

10. A video apparatus power supply according to claim 1 wherein said power supply stage comprises a pulse-width modulator.

11. A video apparatus power supply according to claim 1, wherein a ratio difference compensates for a tendency of the magnitude of said one of said supply voltages to vary.

12. A video apparatus power supply according to claim 1 wherein said feedback signal is generated, both when said first load circuit is energized and when said first load circuit is disabled from being energized.

13. A video apparatus power supply, comprising:

a source of a first on/off control signal coupled to a first load circuit for selectively energizing said first load circuit, in a run mode of operation, and for disabling said first load circuit from being energized, in a standby mode of operation;

a source of a second on/off control signal coupled to a second load circuit for selectively energizing said second load circuit, at least during a first portion of said standby mode of operation, and for disabling said second load circuit from being energized, at least during a second portion of said standby mode of operation;

a power supply stage including a transformer having a first winding for generating from a voltage developed in said first winding a first supply voltage to energize said first load circuit and a second winding for generating a second supply voltage from a voltage developed in said second winding to energize said second load circuit;

a voltage regulator coupled to said transformer and responsive to said first supply voltage for regulating said first supply voltage in a negative feedback manner such that said second supply voltage is cross-regulated;

a voltage divider for coupling said first supply voltage to said voltage regulator to control said voltage regulator;

a source of a switch control signal; and a switch responsive to said switch control signal and coupled to said voltage divider for varying a ratio between impedances of said voltage divider.

14. A video apparatus power supply according to claim 13 wherein a difference in currents produced in said transformer in a standby mode of operation, when said second load circuit is energized, and a run mode of operation, when said first load circuit is energized, tends to vary said second supply voltage and wherein an operation of said switch compensates for the tendency of said second supply voltage to vary.

15. A video apparatus power supply, comprising:

a source of a first on/off control signal coupled to a first load circuit for selectively energizing said first load circuit, in a run mode of operation, and for disabling said first load circuit from being energized, in a standby mode of operation;

a source of a second on/off control signal coupled to a second load circuit for selectively energizing said second load circuit, at least during a first portion of said standby mode of operation, and for disabling said second load circuit from being energized, at least during a second portion of said standby mode of operation; and a power supply stage for generating supply voltages, during said standby mode and said run modes of operation, to energize said first and second load circuits, said power supply stage being selectively operated in a first mode, during said run mode, when said first load circuit is energized, and in a second mode, during said first portion of said standby mode of operation, when said second load circuit is energized.

16. A video apparatus power supply according to claim 15 wherein said first load circuit comprises a deflection circuit that is energized by said one of said supply voltages and said second load circuit comprises a data acquisition mode module that is energized by another one of said supply voltages.

17. A video apparatus power supply according to claim 16 further comprising, a third load coupled to a supply voltage generated in said power supply stage and energized thereby throughout said standby mode of operation.

18. A video apparatus power supply according to claim 15, wherein said power supply stage comprises a switched feedback network responsive to said one of said supply voltages that energizes said deflection circuit for generating a feedback signal that is coupled to an input of said power supply stage to regulate said supply voltages in a negative feedback manner, and wherein said feedback signal is generated, both when said deflection circuit is energized and disabled from being energized, from said one of said supply voltages and having a first ratio associated with said feedback signal and said one of said supply voltages, when said deflection circuit is energized and a second ratio, when said deflection circuit is disabled from being energized.

* * * * *